US011686355B2

(12) United States Patent
Hahn et al.

(10) Patent No.: US 11,686,355 B2
(45) Date of Patent: Jun. 27, 2023

(54) ACTUATING APPARATUS FOR A FRICTION CLUTCH, AND CLUTCH SYSTEM

(71) Applicant: ZF FRIEDRICHSHAFEN AG, Friedrichshafen (DE)

(72) Inventors: Stephan Hahn, Bundorf (DE); Michael Göb, Schwebheim (DE); Daniel Siegler, Werneck (DE); Matthias Abeska, Münnerstadt (DE); Walter Thoma, Erlangen (DE); Christopher Böhm, Bamberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/723,678

(22) Filed: Apr. 19, 2022

(65) Prior Publication Data
US 2022/0333652 A1   Oct. 20, 2022

(30) Foreign Application Priority Data

Apr. 19, 2021 (DE) ..................... 10 2021 203 873.5

(51) Int. Cl.
*F16D 25/12* (2006.01)
*F16D 25/08* (2006.01)
*F16D 23/14* (2006.01)
*F16D 25/063* (2006.01)
*F16D 23/12* (2006.01)

(52) U.S. Cl.
CPC ......... *F16D 23/143* (2013.01); *F16D 25/063* (2013.01); *F16D 25/083* (2013.01); *F16D 25/126* (2013.01); *F16D 2023/123* (2013.01)

(58) Field of Classification Search
CPC .. F16D 23/12; F16D 23/143; F16D 2023/123; F16D 25/126; F16D 25/08–087; F16D 13/752; F16D 13/757; F16D 13/70
See application file for complete search history.

(56) References Cited

FOREIGN PATENT DOCUMENTS

DE   102018211703 A1 *  1/2020  ............. F16D 13/75

* cited by examiner

*Primary Examiner* — David R Morris
(74) *Attorney, Agent, or Firm* — Cozen O'Connor

(57) ABSTRACT

An actuating apparatus has a first and a second actuating element that delimit a pressure chamber. The actuating apparatus has a rotary decoupling bearing coupled via a compensation assembly to the second actuating element for joint movement along the spatial axis. The compensation assembly comprises a first ramp element which is supported axially on the second actuating element and is preloaded relative to the second actuating element by a first preloading apparatus for rotation about the spatial axis and a second ramp element coupled to the rotary decoupling bearing. An axial overall length of the compensation group along the spatial axis changes in the case of a rotation, of the first ramp element relative to the second actuating element. The compensation assembly has a blocking element and a blocking toothing system in blocking engagement with a counter-blocking toothing system of the first ramp element 10 Claims, 5 Drawing Sheets

ACTUATING APPARATUS FOR A FRICTION CLUTCH, AND CLUTCH SYSTEM

BACKGROUND OF INVENTION

1. Field of the Invention

The present disclosure relates to an actuating apparatus for a friction clutch and to a clutch system with the actuating apparatus.

2. Description of Related Art

Pneumatic, concentric release cylinders are used, in particular, in the case of heavy utility vehicles for clutch actuation. Systems of this type afford a multiplicity of advantages on account of the high functional integration and the compact overall design in combination with the possibility of the use of existing periphery (for example, compressed air).

In the case of these systems, an adjusting mechanism is provided which makes a length compensation in the case of clutch wear and a tolerance compensation possible. For initial locking of the adjusting mechanism, a toothing system is provided at the interface to the adjusting piston. The configuration of the toothing system influences the behaviour of the actuating apparatus.

SUMMARY OF THE INVENTION

Against this background, it is an object of one aspect of the present invention to provide an improved actuating apparatus for friction clutches.

The object according to one aspect of the invention is achieved by way of an actuating apparatus for a friction clutch, and a clutch system with the actuating apparatus.

In accordance with a first aspect, the invention relates to an actuating apparatus for a friction clutch. The actuating apparatus comprises a first actuating element (for example, a cylinder or annular cylinder) and a second actuating element (for example, a piston or annular piston) which together delimit a pressure chamber. The pressure chamber is enclosed completely by way of the first actuating element and the second actuating element. The second actuating element can be moved in the pressure chamber along a spatial axis (for example, axial axis of the actuating apparatus) in an actuating direction with respect to the first actuating element by way of the introduction of a pressure medium (for example, an incompressible fluid such as, for instance, oil or a compressible fluid such as, for instance, compressed air). For example, a (closable) opening for the introduction and discharge of the pressure medium can be provided in the first actuating element. Furthermore, the actuating apparatus comprises a rotary decoupling bearing coupled via a compensation assembly to the second actuating element for common movement along the spatial axis. The compensation assembly comprises a first ramp element supported axially on the second actuating element and is preloaded by a first preloading apparatus for rotation about the spatial axis relative to the second actuating element. For example, the first preloading apparatus can be a preloading spring, a first end region of the preloading spring being supported on the second actuating element and a second end region of the preloading spring being supported on the first ramp element. Furthermore, the compensation assembly comprises a second ramp element coupled to the rotary decoupling bearing for common movement along the spatial axis and is supported axially on the first ramp element. The second ramp element is non-rotating with respect to the second actuating element. The first ramp element and the second ramp element in each case axially have a plurality of (that is to say, two or more) ramp faces that follow one another in the circumferential direction. Here, the ramp faces of the second ramp element are supported axially on the ramp faces of the first ramp element. In the case of a rotation, generated by way of the first preloading apparatus, of the first ramp element relative to the second actuating element, an axial overall length of the compensation group changes along the spatial axis. Furthermore, the compensation assembly comprises a blocking element that is non-rotating with respect to the second actuating element and has a blocking toothing system which is in blocking engagement with a counter-blocking toothing system of the first ramp element and can be brought out of blocking engagement with the counter-blocking toothing system by way of axial movement of the blocking element along the spatial axis relative to the first ramp element. A ratio of a spacing between the counter-blocking toothing system and the spatial axis to a base tangent length of the counter-blocking toothing system is at least 4.4 (for example, the ratio can be at least 10, 15, 20, 25, 30, 35, or 40). The base tangent length of the counter-blocking toothing system is defined by way of the spacing of two (substantially parallel) planes. A first flank of a first tooth of two teeth of the counter-blocking toothing system which follow one another (directly) lies in the first of the two planes. A first flank of a second tooth of the two teeth of the counter-blocking toothing system which follow one another (directly) lies in the second of the two planes, the first flank of the second tooth lying opposite a second flank of the first tooth. Equivalently, the base tangent length of the counter-blocking toothing system can be determined as a quotient from the circumferential length (the circumference) of the counter-blocking toothing system and the number of teeth of the counter-blocking toothing system.

The ratio according to one aspect of the invention of the spacing between the counter-blocking toothing system and the spatial axis to the base tangent length of the counter-blocking toothing system makes a high actuation quality of the compensation assembly in the case of the change in its axial overall length during an adjusting operation possible. By the adjusting operation, the axial overall length of the compensation group can be set in accordance with wear, which has occurred in the case of the friction clutch. In this way, a dead volume of the pressure chamber can be minimized and can be kept substantially constant over the service life of the friction clutch, with the result that (substantially) constant dynamics in the case of clutch actuation can be achieved. Great changes in the dead volume in the case of an adjusting operation of the compensation group can be avoided in accordance with the ratio according to the one aspect of the invention of the spacing between the counter-blocking toothing system and the spatial axis to the base tangent length of the counter-blocking toothing system (for example, changes in the dead volume of less than 50 $cm^3$ or 25 $cm^3$ can be achieved in the case of an adjusting operation).

In an analogous manner to what has been described above, a ratio of a spacing of the blocking toothing system from the spatial axis to a base tangent length of the blocking toothing system can likewise be at least 4.4 (for example, the ratio can be at least 10, 15, 20, 25, 30, 35, or 40). The base tangent length of the blocking toothing system is defined by way of the spacing of two planes in an analogous manner to what has been described above. A first flank of a first tooth of two teeth of the blocking toothing system that follow one another (directly) lies in the first of the two planes. A first flank of a second tooth of the two teeth of the blocking toothing system which follow one another (directly) lies in the second of the two planes, the first flank of the second tooth lying opposite a second flank of the first tooth. Equivalently, the base tangent length of the blocking toothing system can be determined as a quotient from the circumferential length (the circumference) of the blocking toothing system and the number of teeth of the blocking toothing system. The base tangent length of the counter-blocking toothing system can be identical to the base tangent length of the blocking toothing system.

In accordance with some exemplary embodiments, the counter-blocking toothing system comprises at least 28 teeth. The provision of at least 28 teeth for the counter-blocking toothing system can make a high actuation quality possible, and can avoid great changes in the dead volume in the case of an adjusting operation of the compensation group. In an analogous manner to what has been described above, the blocking toothing system can also comprise at least 28 teeth.

In some exemplary embodiments, the blocking toothing system and the counter-blocking toothing system run (in the circumferential direction) in each case completely around the spatial axis. By the circumferential toothing systems, tilting of the first ramp element, which is mounted in a floating manner can be avoided, since the teeth of the counter-blocking toothing system adhere locally to the teeth of the blocking toothing system as a result of the preloading of the first ramp element after an adjusting operation.

In accordance with some exemplary embodiments, the blocking toothing system is moulded into the blocking element, and the counter-blocking toothing system is moulded into the first ramp element. In other words: the blocking toothing system is integrated into the material of the blocking element, and the counter-blocking toothing system is integrated into the material of the first ramp element. For example, the blocking element and the first ramp element can be formed from plastic, the blocking toothing system and counter-blocking toothing system being integrated in each case into the plastic. The direct integration of the blocking toothing system and the counter-blocking toothing system into the blocking element and the first ramp element, respectively, can simplify the production thereof, since the blocking toothing system and the counter-blocking toothing system do not have to be configured as separate components and correspondingly do not have to be fastened to the blocking element and the first ramp element, respectively, via respective fastening elements (for example, rivet).

In some exemplary embodiments, the teeth of the blocking toothing system are formed on an axial side face of the blocking element and are oriented counter to the actuating direction. The teeth of the counter-blocking toothing system are formed on an axial side face of the first ramp element and are oriented in the actuating direction. The blocking toothing system of the blocking element can correspondingly be moved into blocking engagement with the counter-blocking toothing system of the first ramp element, in order to prevent the rotation of the first ramp element about the spatial axis. Furthermore, the blocking toothing system can be moved out of blocking engagement with the counter-blocking toothing system by way of axial displacement of the blocking element along the spatial axis, in order to make the rotation of the first ramp element about the spatial axis possible.

In accordance with some exemplary embodiments, the first ramp element is preloaded in the actuating direction with regard to the second actuating element by a second preloading apparatus. For example, the second preloading apparatus can be a cup spring, a first end region of the cup spring being supported on the first ramp element and a second end region of the cup spring being supported on the second actuating element. By the second preloading apparatus, a force accumulator of the friction clutch which is being relieved can be counteracted, and a force equilibrium can therefore be achieved, for example, in the engaged state of the friction clutch.

In some exemplary embodiments, the blocking element is preloaded counter to the actuating direction with regard to the second ramp element by a third preloading apparatus. For example, the third preloading apparatus can be a compression coil spring which runs along the spatial axis, a first end region of the compression coil spring being supported on the second ramp element and a second end region of the compression coil spring being supported on the blocking element. By way of the third preloading apparatus, the blocking element with its blocking toothing system is preloaded counter to the actuating direction towards the first ramp element with its counter-blocking toothing system, in order thus for it to be possible for a rotation of the first ramp element about the spatial axis to be blocked.

In accordance with some exemplary embodiments, the blocking element can be moved along the spatial axis relative to the second actuating element. In other words: the blocking toothing system of the blocking element can be moved out of blocking engagement with the counter-blocking toothing system by way of axial displacement of the blocking element along the spatial axis relative to the second actuating element. Accordingly, the first ramp element can be released for rotation about the spatial axis, in order thus to bring about a relative movement of the ramp faces of the first and the second ramp element with respect to one another in the circumferential direction. The relative movement of the ramp faces of the first and the second ramp element with respect to one another in the circumferential direction makes it possible to change (for example, shorten) the axial overall length of the compensation assembly along the spatial axis, in order for it to be possible for this axial overall length to be adapted to the wear of the friction clutch.

In some exemplary embodiments, the blocking element is of ring-like configuration and has a radially outwardly projecting region which engages radially over an axial end of the first actuating element, with the result that a movement capability of the blocking element counter to the actuating direction is limited by way of an interaction of the radially outwardly projecting region of the blocking element with the axial end of the first actuating element. By way of the abovementioned construction, the movement capability of the blocking element counter to the actuating direction can be limited in a structurally simple way, in order to move the blocking toothing system and the counter-blocking toothing system out of blocking engagement in the case of the occurrence of a certain (predefined) wear of the friction clutch, and to make a change or adaptation of the axial overall length of the compensation assembly along the spatial axis to the wear of the friction clutch possible by way of the rotation caused in this way of the first ramp element.

In accordance with a second aspect, the invention relates to a clutch system. The clutch system comprises a friction clutch with a force accumulator which can be loaded for clutch actuation. Furthermore, the clutch system comprises an actuating apparatus according to the invention. The rotary decoupling bearing is coupled to the force accumulator for selective loading of the latter. The clutch system according to the invention can make a minimization of the dead volume of the pressure chamber possible over the service life of the friction clutch, and therefore (substantially) constant dynamics in the case of clutch actuation. Furthermore, the clutch system according to the invention can make a high actuation quality possible in the case of the adjustment of the compensation assembly.

DETAILED DESCRIPTION OF THE PRESENTLY PREFERRED EMBODIMENTS

Figure 1:
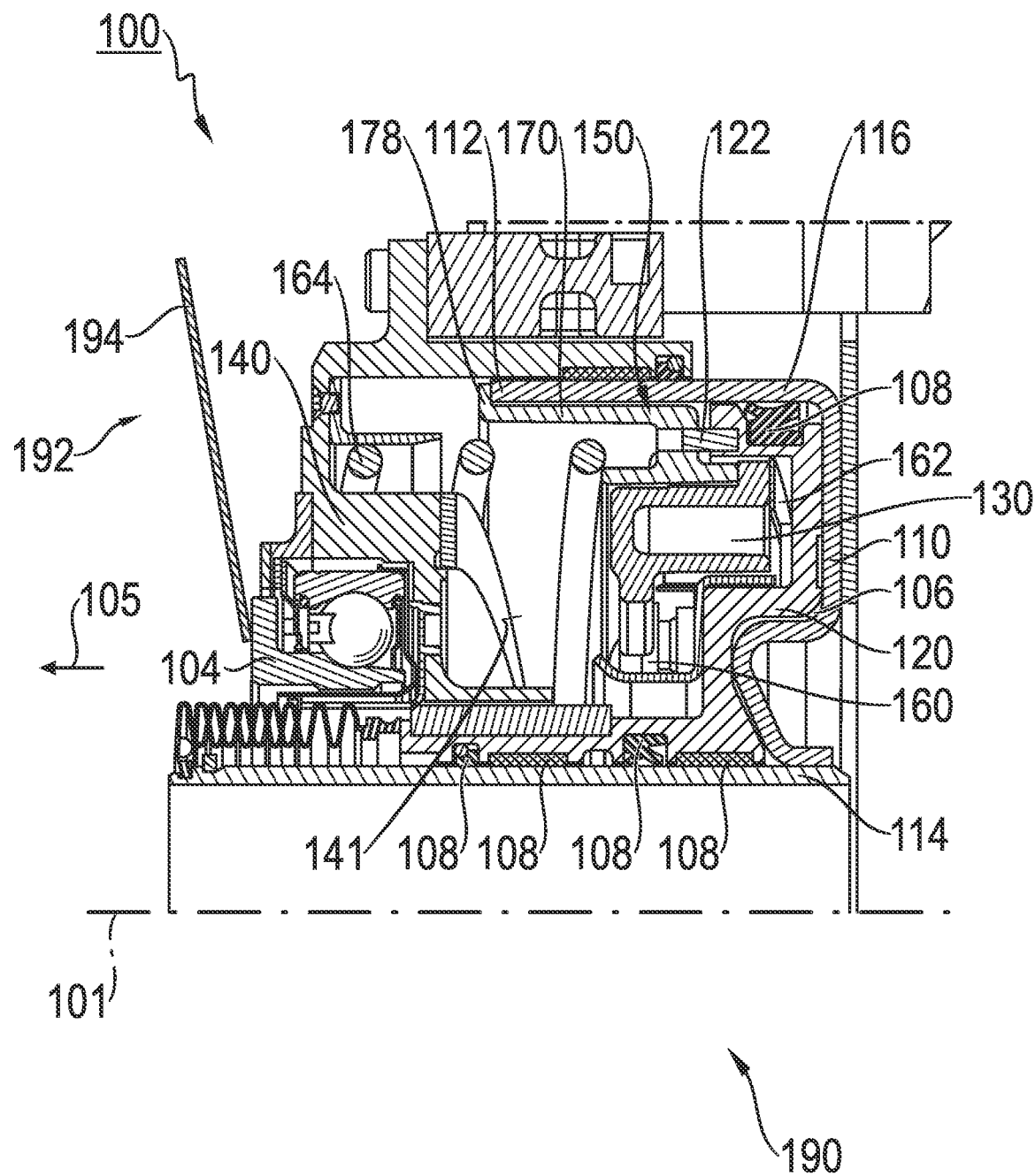
FIG. 1 is a clutch system.

FIG. 1 shows a partial longitudinal sectional view of a clutch system 190 with a friction clutch 192 and an actuating apparatus 100 for the friction clutch 192. In FIG. 1, the friction clutch 192 is indicated merely on the basis of a force accumulator 194 which can be loaded for clutch actuation. The other constituent parts of the friction clutch 192, such as the clutch plate, are not shown explicitly. The force accumulator 194 can be configured, for example, as a diaphragm spring.

The actuating apparatus 100 comprises a first actuating element 110 and a second actuating element 120. The first actuating element 110 is a ring-like structure which is configured, for example, as an annular cylinder and surrounds a spatial axis 101 in a ring-like manner. The first actuating element 110 comprises an inner circumferential wall 114 and an outer circumferential wall 116. The second actuating element 120 is arranged between the inner circumferential wall 114 and the outer circumferential wall 116. The second actuating element 120 is a ring-like structure which is configured, for example, as an annular piston and surrounds the spatial axis 101 in a ring-like manner. In the example of FIG. 1, the spatial axis 101 is the axial axis of the actuating apparatus 100 or the clutch system 190.

The second actuating element 120 is sealed with respect to the inner circumferential wall 114 and the outer circumferential wall 116 of the first actuating element 110 via a plurality of seal elements 108, and is guided movably along the spatial axis 101.

The first actuating element 110 and the second actuating element 120 delimit a pressure chamber 106. The pressure chamber 106 is sealed by the plurality of seal elements 108. A pressure medium can be introduced into the pressure chamber 106, in order to move the second actuating element 120 with respect to the first actuating element 110 along the spatial axis 101 in an actuating direction 105 by way of the build-up of pressure by the introduced pressure medium. The pressure medium can be an incompressible fluid such as oil or a compressible fluid such as compressed air. The connector for the introduction of the pressure medium into the pressure chamber 106 is not shown explicitly in FIG. 1 and can be configured, for example, in the first actuating element 110. Accordingly, a loading or moving action of force can be built up in the actuating direction 105.

In the case of movement of the second actuating element 120 and the actuating direction 105, it loads a radially inner region of the force accumulator 194, which is configured as a diaphragm spring via a rotary decoupling bearing 104, connected in between, of the actuating apparatus 100. By the loading with force of the force accumulator 194, it can be displaced or pivoted in order to carry out a release operation in the actuating direction 105. An action of force of the force accumulator 194 on a pressure plate (not shown) of the friction clutch 192 can thus be decreased or cancelled, in order to actuate or to release the friction clutch 192.

The rotary decoupling bearing 104 is coupled via a compensation assembly 150 to the second actuating element 120 for common movement along the spatial axis 101. Here, the rotary decoupling bearing 104 is supported axially on the compensation assembly 150, which is in turn supported axially on the second actuating element 120.

The compensation assembly 150 comprises a first ramp element 130 and a second ramp element 140. The first ramp element 130 is supported axially on the second actuating element 120. The second ramp element 140 is supported axially on the first ramp element 130. The rotary decoupling bearing 104 is coupled to or supported axially on the second ramp element 140 for common movement along the spatial axis 101.

The first ramp element 130 and the second ramp element 140 in each case axially have a plurality of (for example, 2, 3, 4 or more) ramp faces which follow one another in the circumferential direction. Here, the ramp faces 141 of the second ramp element 140 are supported axially on the ramp faces of the first ramp element 130. In other words, the ramp faces 141 of the second ramp element 140 bear against the ramp faces of the first ramp element 130. Here, in FIG. 1, merely the ramp faces 141 of the second ramp element 140 are visible, and the ramp faces of the first ramp element 130 cannot be seen on account of the selected perspective.

The first ramp element 130 is preloaded by a first preloading apparatus 160 for rotation about the spatial axis 101 relative to the second actuating element 120. In FIG. 1, the first preloading apparatus 160 is configured as a preloading spring. A first end region of the preloading spring is supported on the second actuating element 120, and a second end region of the preloading spring is supported on the first ramp element 130.

The second ramp element 140 is non-rotating relative to the second actuating element 120, and is held in an axially movable manner along the spatial axis 101. In the case of a rotation, generated by way of the first preloading apparatus 160, of the first ramp element 130 relative to the second actuating element 120, an axial overall length of the compensation group 150 changes along the spatial axis 101. In the case of the rotation of the first ramp element 130 relative to the second actuating element 120, a relative rotation of the ramp faces of the first ramp element 130 with respect to the ramp faces 141 of the second ramp element 140 takes place, with the result that a change in the axial overall length of the compensation group 150 along the spatial axis 101 takes place on account of the ramp faces, sliding on one another, of the ramp elements 130 and 140. Accordingly, the axial overall length of the compensation group 150 can be increased or decreased.

The first ramp element 130 is preloaded in the actuating direction 105 with regard to the second actuating element 120 by a second preloading apparatus 162. In FIG. 1, the second preloading apparatus 162 is configured as a cup spring. A first end region of the cup spring is supported on the first ramp element 130, and a second end region of the cup spring is supported on the second actuating element 120.

Furthermore, the compensation assembly 150 comprises a blocking element 170, which is nonrotating with respect to the second actuating element 120 and is held such that it can be moved axially along the spatial axis 101 relative to the second actuating element 120. To this end, a respective groove 171 and 121 is configured in the blocking element 170 and the second actuating element 120, in which grooves a guide pin 122 extends. The guide pin 122 extends along the spatial axis 101, in order to provide an anti-rotation safeguard, which permits the axial relative movement, between the blocking element 170 and the second actuating element 120.

The blocking element 170 is preloaded counter to the actuating direction 105 with regard to the second ramp element 140 by a third preloading apparatus 164. In FIG. 1, the third preloading apparatus 164 is configured as a compression coil spring that runs along the spatial axis 101. A first end region of the compression coil spring is supported on the second ramp element 140, and a second end region of the compression coil spring is supported on the blocking element 170.

The blocking element 170 is of ring-like configuration and has a radially outwardly projecting region 178 that engages radially over an axial end 112 on the outer circumferential wall 116 of the first actuating element 110. Accordingly, a movement capability of the blocking element 170 counter to the actuating direction 105 is limited by way of an interaction of the radially outwardly projecting region 178 of the blocking element 170 with the axial end 112 of the first actuating element 110.

Figure 2:
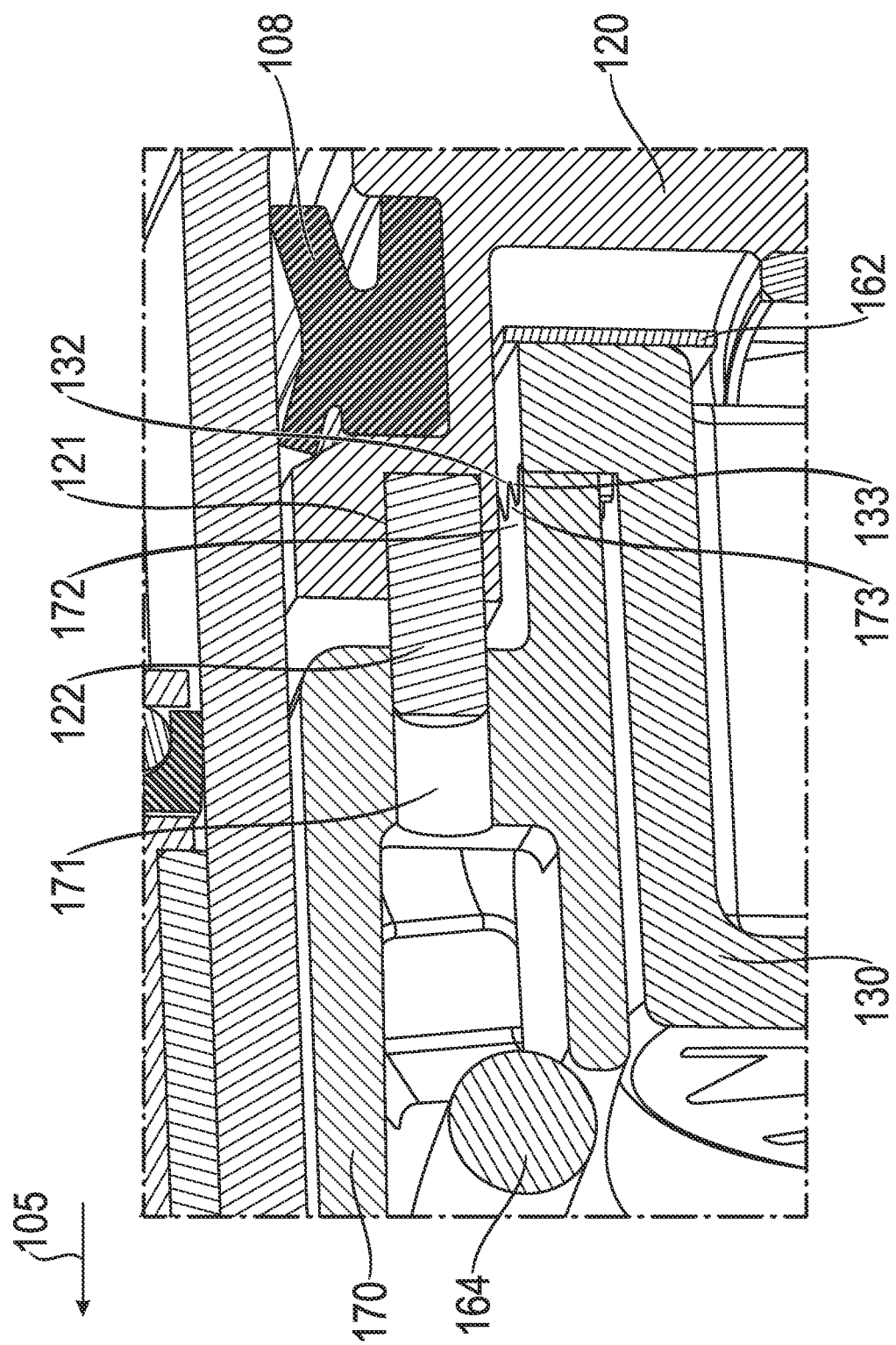
FIG. 2 is a first detailed view of the clutch system which is shown in FIG. 1.
Figure 3:
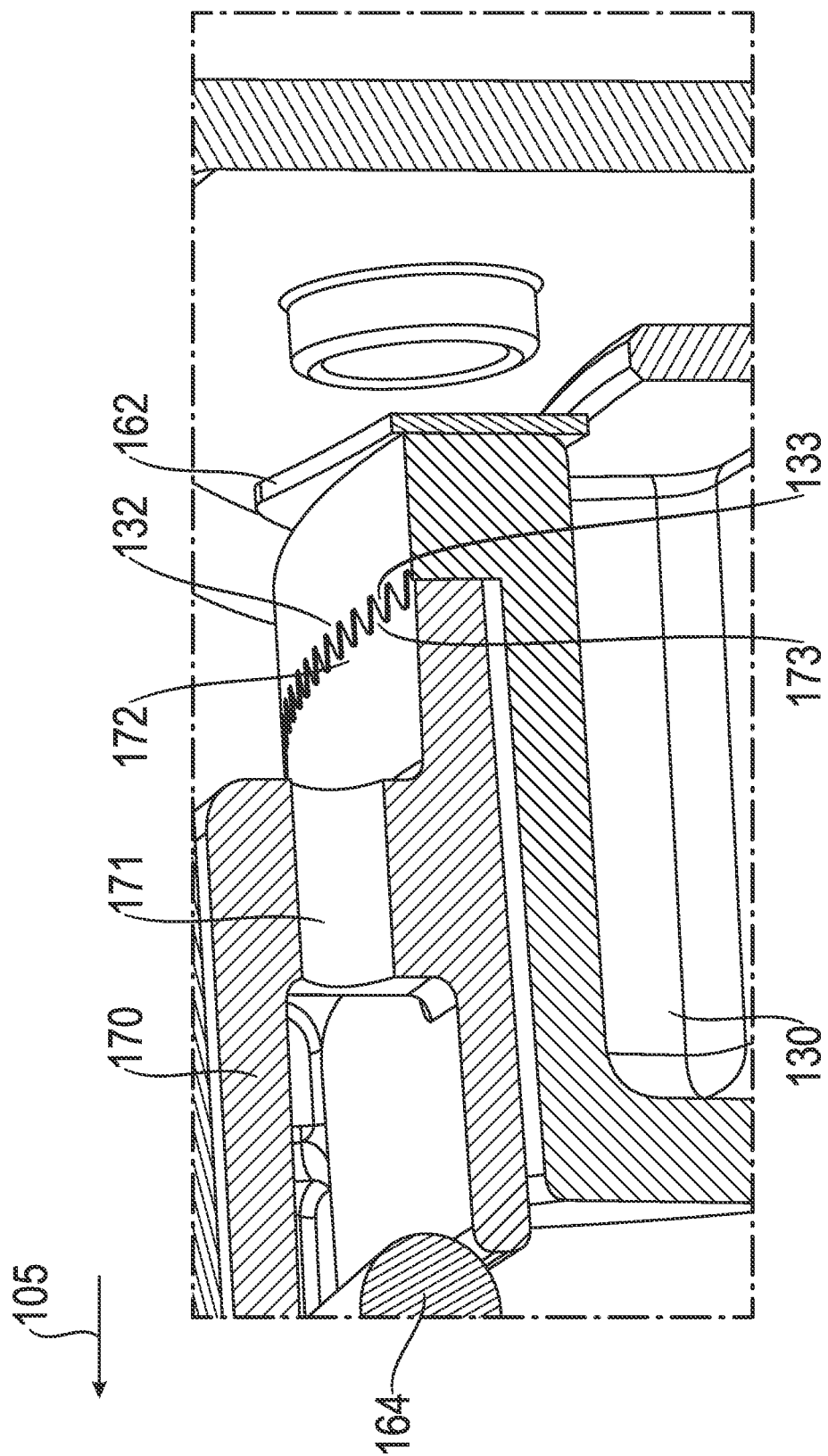
FIG. 3 is a second detailed view of the clutch system which is shown in FIG. 1.

The blocking element 170 has a blocking toothing system 172. The blocking toothing system 172 is in blocking engagement with a counter-blocking toothing system 132 of the first ramp element 130, and can be moved out of blocking engagement with the counter-blocking toothing system 132 by way of axial displacement of the blocking element 170 along the spatial axis 101 relative to the first ramp element 130. This is shown in detail in FIG. 2 and FIG. 3. Here, the teeth 173 of the blocking toothing system 172 are formed on an axial side face of the blocking element 170 and are oriented counter to the actuating direction 105. The teeth 133 of the counter-blocking toothing system 132 are formed correspondingly on an axial side face of the first ramp element 130 and are oriented in the actuating direction 105.

The blocking toothing system 172 is moulded into the blocking element 170. Analogously, the counter-blocking toothing system 132 is moulded into the first ramp element 130. For example, the blocking element 170 and the first ramp element 130 can be formed from plastic (just like the second ramp element 140), the blocking toothing system 172 and the counter-blocking toothing system 132 being integrated in each case into the plastic. The direct integration of the blocking toothing system 172 and the counter-blocking toothing system 132 into the blocking element 170 and the first ramp element 130, respectively, can simplify the production thereof, since the blocking toothing system 172 and the counter-blocking toothing system 132 do not have to be configured as separate components and accordingly do not have to be fastened to the blocking element 170 and the first ramp element 130, respectively, via respective fastening elements (for example, rivets).

FIG. 1 shows a state of the clutch system 190, in which the friction clutch 192 is engaged and is not subject to wear. Via the force accumulator 194, a force acts counter to the actuating direction 105 on the rotary decoupling bearing 104. The force is transmitted by the rotary decoupling bearing 104 to the compensation assembly 150, and is transmitted from the first ramp element 130 by the second preloading apparatus 162 to the second actuating element 120, with the result that the latter bears against the first actuating element 110.

As a result of the preloading action of the second preloading apparatus 162 and the third preloading apparatus 164, the blocking toothing system 172 is in blocking engagement with the counter-blocking toothing system 132 of the first ramp element 130, with the result that the first ramp element 130, which is under the preload of the first preloading apparatus 160 cannot rotate, and therefore a defined axial relative positioning of the second actuating element 120 with regard to the rotary decoupling bearing 104 is predefined. Accordingly, a defined actuation of the friction clutch 192 can take place by the introduction of pressure medium into the pressure chamber 106.

If wear then occurs in the case of the friction clutch 192, the force accumulator 194 can increasingly relax further during engagement. Accordingly, its radially inner region can move further towards the first actuating element 110 counter to the actuating direction 105. Here, the rotary decoupling bearing 104 moves further towards the first actuating element 110, and exerts a corresponding force counter to the actuating direction 105 on the compensation assembly 150, with the result that the first ramp element 130 moves counter to the action of the second preloading apparatus 162 towards the second actuating element 120. On account of the preloading action of the third preloading apparatus 164, the blocking element 170 also moves counter to the actuating direction 105 until the radially outwardly projecting region 178 of the blocking element 170 ultimately abuts the axial end 112 of the first actuating element 110 and thus limits the movement of the blocking element 170 counter to the actuating direction 105.

On account of the limited movement of the blocking element 170 counter to the actuating direction 105, an axial relative movement occurs along the spatial axis 101 between the blocking element 170 and the first ramp element 130. As a consequence of the axial relative movement between the blocking element 170 and the first ramp element 130, the blocking toothing system 172 of the blocking element 170 passes out of blocking engagement with the counter-blocking toothing system 132 of the first ramp element 130. The first ramp element 130 is therefore no longer secured against the preloading action of the first preloading apparatus 160, with the result that a rotation of the first ramp element 130 relative to the second actuating element 120 occurs. On account of the relative rotation which takes place of the ramp faces of the first ramp element 130 with respect to the ramp faces of the second ramp element 140, a change in the axial overall length of the compensation group 150 takes place along the spatial axis 101. For example, the axial overall length of the compensation group 150 along the spatial axis 101 can decrease on account of the relative rotation, with the result that the axial spacing of the second actuating element 120 with regard to the rotary decoupling bearing 104 can be decreased, in order to counteract the increasing relaxation of the force accumulator 194 as a consequence of the wear of the friction clutch 192.

As a consequence of the change in the axial overall length of the compensation group 150 along the spatial axis 101, the blocking toothing system 172 of the blocking element 170 comes into blocking engagement again with the counter-blocking toothing system 132 of the first ramp element 130. Accordingly, after the compensation of the wear of the friction clutch 192, the first ramp element 130 is again secured against the preloading action of the first preloading apparatus 160. After the wear compensation, in the case of a changed (for example, shortened) axial overall length of the compensation group 150, the friction clutch 192 can be actuated again by the actuating apparatus 100.

The dead volume to be provided of the pressure chamber 106 is comparatively small and does not substantially impair the precision of the actuation of the friction clutch 192. The axial length compensation by the change in the axial overall length of the compensation group 150 along the spatial axis makes it possible for the dead volume to be kept substantially constant over the service life of the friction clutch 192, with the result that an actuating characteristic of the clutch system 190 is substantially constant over the service life of the friction clutch 192.

The counter-blocking toothing system 132 and the blocking toothing system 172 run in the circumferential direction in each case completely around the spatial axis 101, that is to say the counter-blocking toothing system 132 and the blocking toothing system 172 are configured in each case as a completely circumferential toothing system. By the circumferential toothing systems, tilting of the first ramp element 130 which is mounted in a floating manner can be avoided, since the teeth 133 of the counter-blocking toothing system 132 adhere locally to the teeth 173 of the blocking toothing system 172 as a result of the preloading of the first preloading apparatus 160 after an adjusting operation. In addition, the production of the first ramp element 130 and of the blocking element 170 is thus facilitated. Furthermore, the first ramp element 130 and the blocking element 170 do not have to be installed in an aligned manner with respect to one another.

Figure 4:
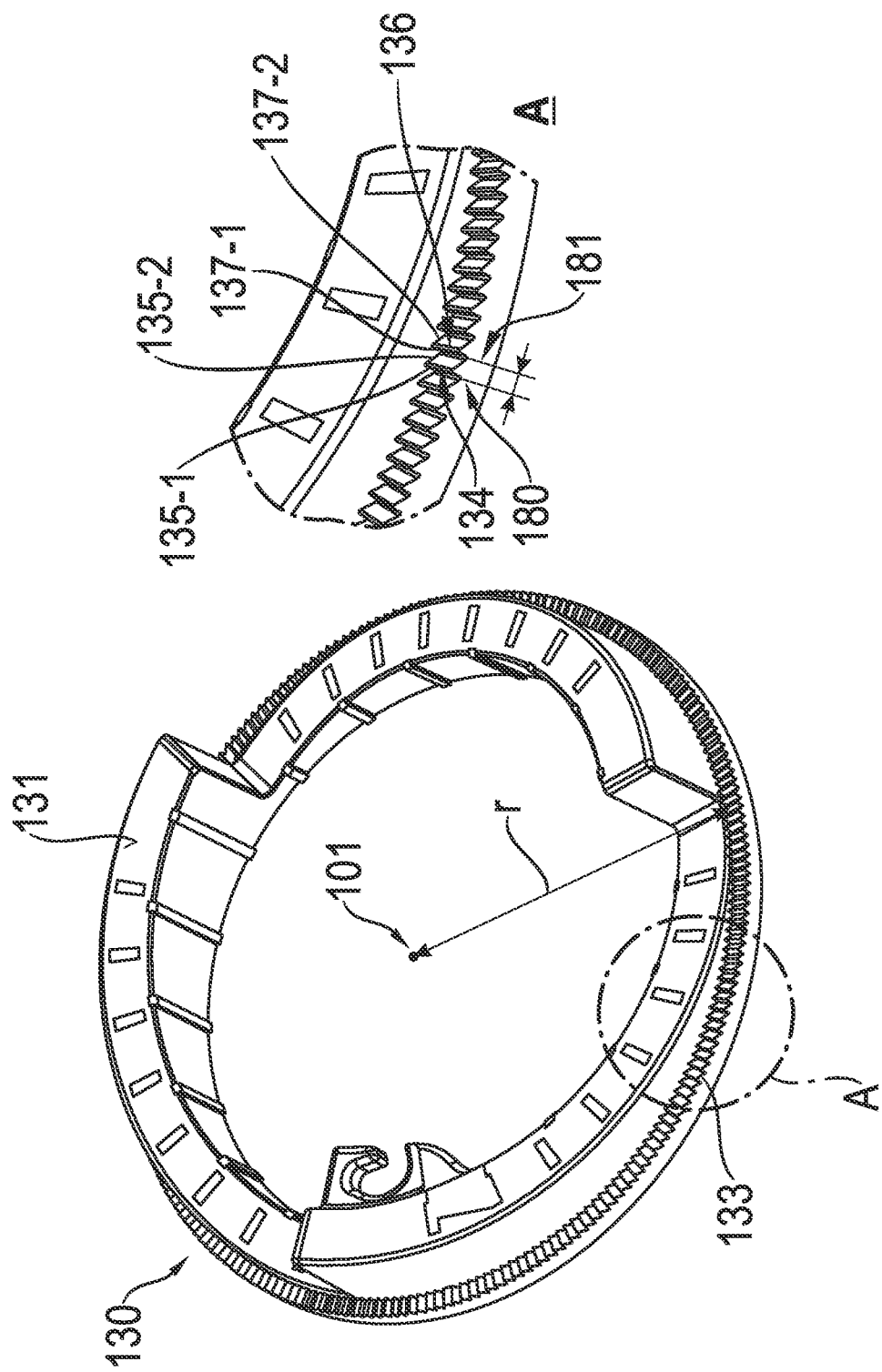
FIG. 4 is a first ramp element.

A ratio of a spacing r between the counter-blocking toothing system 132 and the spatial axis 101 to a base tangent length B of the counter-blocking toothing system 132 is at least $1.4 \cdot \pi \approx 4.4$. In other words: the ratio of the diameter d of the counter-blocking toothing system 132 to the base tangent length B of the counter-blocking toothing system 132 is at least $2.8 \cdot \pi \approx 8.8$. For example, the ratio of the spacing r between the counter-blocking toothing system 132 and the spatial axis 101 to the base tangent length B of the counter-blocking toothing system 132 can be at least 10, 15, 20, 25, 30, 35, or 40 in some exemplary embodiments. Accordingly, the ratio of the diameter d of the counter-blocking toothing system 132 to the base tangent length B of the counter-blocking toothing system 132 can be at least 20, 30, 40, 50, 60, 70, or 80. The spacing r of the counter-blocking toothing system 132 from the spatial axis 101 is shown in FIG. 4. The base tangent length B of the counter-blocking toothing system 132 is shown in the enlarged detail A of the first ramp element 130 in FIG. 4. The spacing r between the counter-blocking toothing system 132 and the spatial axis 101 can be, for example, between 35 mm and 100 mm. The base tangent length B of the counter-blocking toothing system 132 can be, for example, between 1 mm and 8 mm, in particular between 2 mm and 4 mm.

The base tangent length B of the counter-blocking toothing system 132 is defined by way of the spacing of two planes 180 and 181. A first flank 135-1 of a first tooth 134 of two teeth 134 and 136 of the counter-blocking toothing system 132 which follow one another directly lies in the plane 180. A first flank 137-1 of the second tooth 136 of the two teeth 134 and 136 of the counter-blocking toothing system 132, which follow one another directly lies in the plane 181. Here, the first flank 137-1 of the second tooth 136 lies opposite a second flank 135-2 of the first tooth 134. Furthermore, the second tooth 136 has a second flank which does not lie opposite either of the flanks 135-1 and 135-2 of the first tooth 134. In other words: the two planes 180 and 181 in each case make contact with either the respective right-hand flank of the two teeth 134 and 136, which follow one another directly or the respective left-hand flank of the two teeth 134 and 136 which follow one another directly.

The actuation quality during the change in the axial overall length of the compensation group 150 can be configured via the design of the counter-blocking toothing system 132. The ratio according to the invention of the spacing r between the counter-blocking toothing system 132 and the spatial axis 101 to the base tangent length B of the counter-blocking toothing system 132 makes a high actuation quality possible during an adjusting operation. On account of the ratio according to one aspect of the invention of the spacing r between the counter-blocking toothing system 132 and the spatial axis 101 to the base tangent length B of the counter-blocking toothing system 132, the dead volume of the pressure chamber 106 can be minimized over the service life of the friction clutch 192 with the avoidance of great changes in the dead volume during an adjusting operation. For example, for an initial dead volume of 100 cm$^3$, changes in the dead volume of less than 50 cm$^3$ or 25 cm$^3$ in the case of an adjusting operation can be achieved.

Accordingly, a lower limit to the number of teeth S of the counter-blocking toothing system 132 can be determined herefrom. The number of teeth S of the counter-blocking toothing system 132 results from the quotient of the circumference U of the counter-blocking toothing system 132 and the base tangent length B of the counter-blocking toothing system 132. The ratio $d/B \geq 8.8 \approx 2.8 \cdot \pi$ can be correspondingly reformulated by way of insertion, with the result that $d \cdot S/U \geq 8.8 \approx 2.8 \cdot \pi$. The circumference is defined by way of the product from the diameter d and pi $\pi$, such that the results of the number of teeth S of the counter-blocking toothing system 132 is that $S \geq 2.8 \cdot \pi \cdot \pi \approx 8.8 \cdot \pi \approx 28$. Therefore, according to the invention, the counter-blocking toothing system 132 has at least S=28 teeth.

The actuation quality is characterized by the base tangent length B, which correlates with the slope of the ramp faces 131 of the first ramp element 130, and the diameter d of the counter-blocking toothing system 132. In other words: the tooth slope of a single tooth of the counter-blocking toothing system 132 is defined via the slope of the ramp faces 131 of the first ramp element 130. For example, in the case of a slope of the ramp faces of 10° with a number of S=225 teeth of the counter-blocking toothing system 132, an actuation quality of 0.375 mm in the case of a change of the axial overall length of the compensation group 150, that is to say in the case of an adjusting operation of the compensation group 150 in order to compensate for the wear of the friction clutch 192, can be achieved. Via the ratio of the tooth slope angle to the slope of the ramp faces 131 of the first ramp element 130, the actuation accuracy can additionally be set in a dimensionless manner.

For a ratio $d/B \approx 8.8$, for example, a slope of approximately 13° of the ramp faces in the case of the presence of two ramp faces in the case of a change in the axial overall length of the compensation assembly 150 of at most 2 mm during the adjusting operation can be achieved if an overall compensation height of 28 mm is assumed.

In the case of values which are smaller than those according to the invention for the ratio d/B, the actuation quality in the case of the adjustment of the axial overall length of the compensation group 150 becomes less favourable, and the change in the dead volume per adjusting operation increases.

The ratio according to one aspect of the invention of the diameter d of the counter-blocking toothing system 132 to the base tangent length B of the counter-blocking toothing system 132 can also be utilized with stepped ramp faces, that is to say in the case of ramp faces with a slope angle which changes in a stepped manner. Stepped ramp faces are used, for example, in order to realise a flatter slope on the ramp contact in the case of an identical axial compensation. Here, the slope angle can be selected to be smaller than that in the case of ramp faces without a step.

Figure 5:
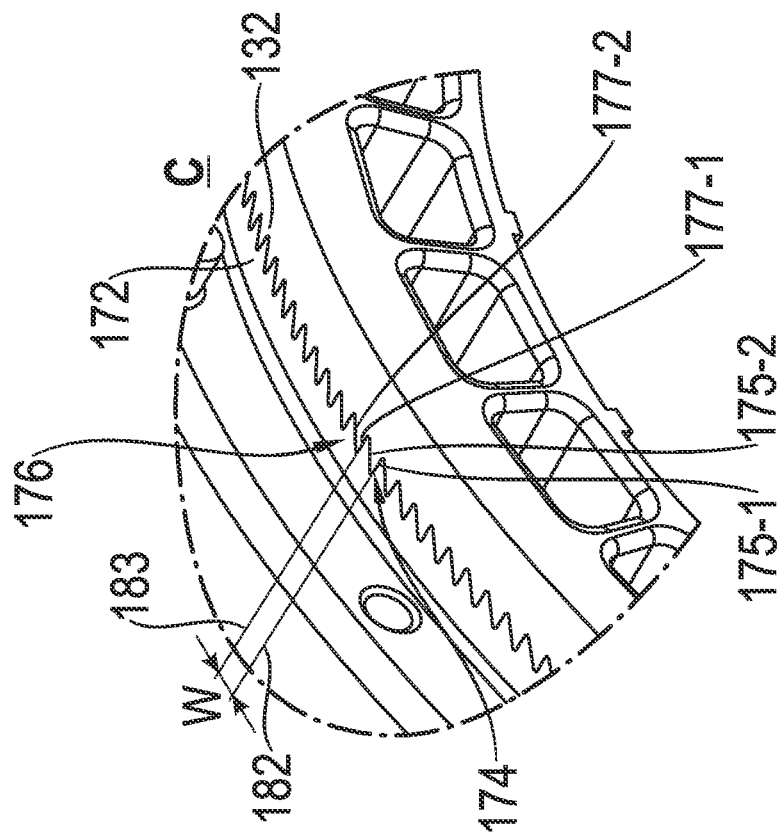
FIG. 5 is a first ramp element together with a blocking element.
Figure 5:
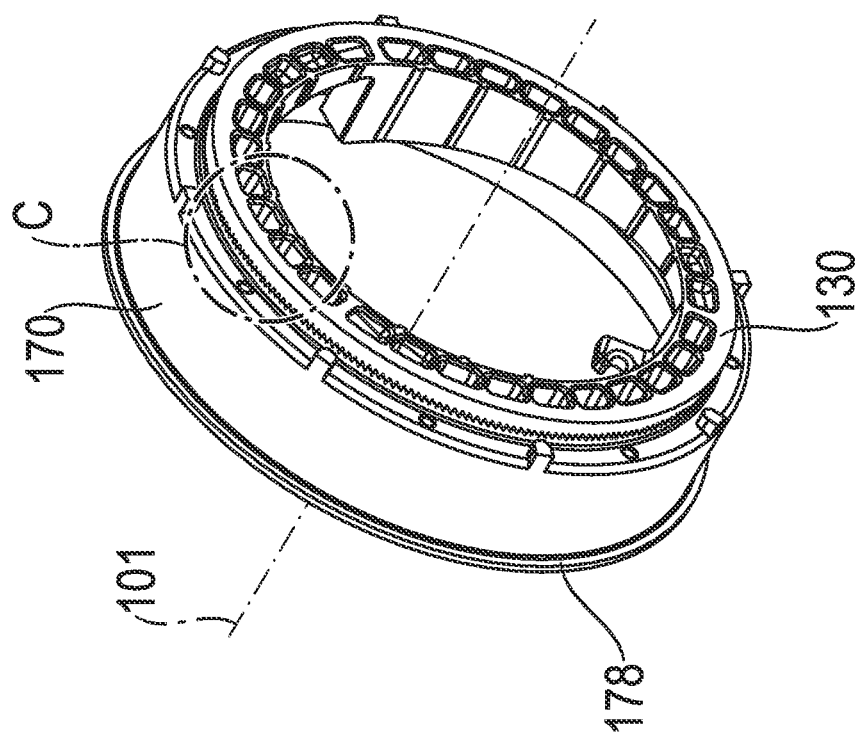

Furthermore, FIG. 5 also shows the blocking element 170 and the first ramp element 130 while they are in blocking engagement with one another. As can be seen, in particular, from the enlarged detail C of FIG. 5, the blocking toothing system 172 of the blocking element 170 is in blocking engagement here with the counter-blocking toothing system 132 of the first ramp element 130. By way of axial displacement of the blocking element 170 along the spatial axis 101 relative to the first ramp element 130, the blocking toothing system 172 of the blocking element 170 can be moved out of blocking engagement with the counter-blocking toothing system 132 of the first ramp element 130.

Analogously to what has been described above, the ratio of the spacing between the blocking toothing system 172 and the spatial axis 101 to a base tangent length W of the blocking toothing system 172 is also at least $1.4 \cdot \pi \approx 4.4$. In other words: the ratio of the diameter of the blocking toothing system 172 to the base tangent length W of the blocking toothing system 172 is at least $2.8 \cdot \pi \approx 8.8$. For example, the ratio of the spacing between the blocking toothing system 172 and the spatial axis 101 to the base tangent length W of the blocking toothing system 172 can be at least 10, 15, 20, 25, 30, 35, or 40 in some exemplary embodiments. Accordingly, the ratio of the diameter of the blocking toothing system 172 to the base tangent length W of the blocking toothing system 172 can be at least 20, 30, 40, 50, 60, 70, or 80. Analogously to what has been described above, the base tangent length W of the blocking toothing system 172 is defined by way of the spacing of two planes 182 and 183. A first flank 175-1 of a first tooth 174 of two teeth 174 and 176 of the blocking toothing system 172 which follow one another directly lies in the plane 182. A first flank 177-1 of the second tooth 176 lies in the plane 183. The first flank 177-1 of the second tooth 176 lies opposite a second flank 175-2 of the first tooth 174. Furthermore, the second tooth 176 has a second flank 177-2 that does not lie opposite either of the flanks 175-1 and 175-2 of the first tooth 174. Analogously, the blocking toothing system 172 can also comprise at least 28 teeth. In accordance with exemplary embodiments, the blocking toothing system 172 can be of analogous configuration with respect to the counter-blocking toothing system 132.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuating apparatus for a friction clutch, comprising:
   a first actuating element;
   a second actuating element;
   a pressure chamber delimited by the first actuating element and the second actuating element,
   wherein the second actuating element is configured for movement along a spatial axis in an actuating direction with respect to the first actuating element by introduction of a pressure medium into the pressure chamber;
   a compensation assembly;
   a rotary decoupling bearing coupled via the compensation assembly to the second actuating element for joint movement along the spatial axis,
   wherein the compensation assembly comprising:
      a first ramp element supported axially on the second actuating element and is preloaded relative to the second actuating element by a first preloading apparatus for rotation about the spatial axis;
      a second ramp element coupled to the rotary decoupling bearing for common movement along the spatial axis and is supported axially on the first ramp element, the second ramp element being non-rotating with respect to the second actuating element, and
      an axial overall length of the compensation assembly along the spatial axis changing in case of rotation, produced by way of the first preloading apparatus, of the first ramp element relative to the second actuating element; and
   a blocking element which is non-rotating with respect to the second actuating element and has a blocking toothing system which is in blocking engagement with a counter-blocking toothing system of the first ramp element and can be moved out of blocking engagement with the counter-blocking toothing system by way of axial movement of the blocking element along the spatial axis relative to the first ramp element,
   wherein a ratio of a spacing between the counter-blocking toothing system and the spatial axis to a base tangent length of the counter-blocking toothing system being at least 4.4.

2. The actuating apparatus according to claim 1, wherein the counter-blocking toothing system comprises at least 28 teeth.

3. The actuating apparatus according to claim 1, wherein the blocking toothing system and the counter-blocking toothing system each run completely around the spatial axis.

4. The actuating apparatus according to claim 1, wherein the blocking toothing system is moulded into the blocking element, and the counter-blocking toothing system is moulded into the first ramp element.

5. The actuating apparatus according to claim 1, wherein teeth of the blocking toothing system are formed on an axial side face of the blocking element and are oriented counter to the actuating direction, and in that teeth of the counter-blocking toothing system are formed on an axial side face of the first ramp element and are oriented in the actuating direction.

6. The actuating apparatus according to claim 1, wherein the first ramp element is preloaded in the actuating direction with regard to the second actuating element by a second preloading apparatus.

7. The actuating apparatus according to claim 6, wherein the blocking element is preloaded counter to the actuating direction with regard to the second ramp element by a third preloading apparatus.

8. The actuating apparatus according to claim 1, wherein the blocking element can be moved along the spatial axis relative to the second actuating element.

9. The actuating apparatus according to claim 1, wherein the blocking element is of ring-like configuration and has a radially outwardly projecting region which engages radially over an axial end of the first actuating element, so that a movement capability of the blocking element counter to the actuating direction is limited by an interaction of the radially outwardly projecting region of the blocking element with the axial end of the first actuating element.

10. A clutch system, comprising:
 a friction clutch with a force accumulator which can be loaded for clutch actuation;
 an actuating apparatus for the friction clutch, comprising:
  a first actuating element;
  a second actuating element;
  a pressure chamber delimited by the first actuating element and the second actuating element,
  wherein the second actuating element is configured for movement along a spatial axis in an actuating direction with respect to the first actuating element by introduction of a pressure medium into the pressure chamber;
  a compensation assembly;
  a rotary decoupling bearing coupled via the compensation assembly to the second actuating element for joint movement along the spatial axis,
  wherein the compensation assembly comprising:
   a first ramp element supported axially on the second actuating element and is preloaded relative to the second actuating element by a first preloading apparatus for rotation about the spatial axis;
   a second ramp element coupled to the rotary decoupling bearing for common movement along the spatial axis and is supported axially on the first ramp element, the second ramp element being non-rotating with respect to the second actuating element, and
   an axial overall length of the compensation assembly along the spatial axis changing in case of rotation, produced by way of the first preloading apparatus, of the first ramp element relative to the second actuating element; and
   a blocking element which is non-rotating with respect to the second actuating element and has a blocking toothing system which is in blocking engagement with a counter-blocking toothing system of the first ramp element and can be moved out of blocking engagement with the counter-blocking toothing system by way of axial movement of the blocking element along the spatial axis relative to the first ramp element,
  wherein a ratio of a spacing between the counter-blocking toothing system and the spatial axis to a base tangent length of the counter-blocking toothing system being at least 4.4; and
  wherein the rotary decoupling bearing being coupled to the force accumulator for selective loading of the force accumulator.

* * * * *